US011050967B2

(12) United States Patent
Yu et al.

(10) Patent No.: US 11,050,967 B2
(45) Date of Patent: Jun. 29, 2021

(54) IMAGE DISPLAY DEVICE, METHOD OF CONNECTING PERIPHERAL DEVICE, AND IMAGE DISPLAY SYSTEM INCLUDING SAME IMAGE DISPLAY DEVICE

(71) Applicant: LG ELECTRONICS INC., Seoul (KR)

(72) Inventors: Seon Il Yu, Seoul (KR); Jang Hee Lee, Seoul (KR); Kwangseob Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/922,167

(22) Filed: Jul. 7, 2020

(65) Prior Publication Data

US 2021/0067727 A1    Mar. 4, 2021

(30) Foreign Application Priority Data

Sep. 3, 2019   (KR) .................. 10-2019-0108982

(51) Int. Cl.
  *H04N 5/44*  (2011.01)
  *G06F 3/14*  (2006.01)
  *H04N 3/10*  (2006.01)

(52) U.S. Cl.
  CPC .............. *H04N 5/44* (2013.01); *G06F 3/14* (2013.01); *H04N 3/10* (2013.01)

(58) Field of Classification Search
  CPC .............. H04N 5/44; H04N 3/10; G06F 3/14
  See application file for complete search history.

(56) References Cited

U.S. PATENT DOCUMENTS

2003/0125074 A1*  7/2003  Tanada ............. H04M 1/72412
                                                                 455/552.1
2004/0108940 A1*  6/2004  Witkow ................. G08C 17/00
                                                                 340/4.41

(Continued)

FOREIGN PATENT DOCUMENTS

WO    WO 2018/026138 A1    2/2018

*Primary Examiner* — Michael E Teitelbaum
(74) *Attorney, Agent, or Firm* — Birch, Stewart, Kolasch & Birch, LLP (57) ABSTRACT

An image display device includes an external device interface unit configured to connect the image display device with an external device; a display unit configured to display an image received from the external device; a user input interface unit configured to receive an input signal and to send a control signal corresponding to the input signal to a relay device acting a communication relay between the image display device and the external device; and a controller configured to in response to the image display device being powered on, check whether or not a connection log of the image display device includes a previous connection between the image display device and the relay device, scan for an advertisement packet from the relay device at a first scan interval when the connection log does not include the previous connection between the image display device and the relay device, and scan for the advertisement packet from the relay device at a second scan interval having a longer time duration than the first scan interval when the connection log includes the previous connection between the image display device and the relay device.

20 Claims, 9 Drawing Sheets

(56) References Cited

U.S. PATENT DOCUMENTS

| | | | |
|---|---|---|---|
| 2005/0114902 A1* | 5/2005 | Choi | H04N 21/41265 |
| | | | 725/100 |
| 2010/0185575 A1 | 7/2010 | Martin Lopez et al. | |
| 2011/0021142 A1* | 1/2011 | Desai | H04W 8/005 |
| | | | 455/41.2 |
| 2013/0003715 A1* | 1/2013 | Xhafa | H04W 52/0229 |
| | | | 370/349 |
| 2014/0062677 A1 | 3/2014 | Kakuda | |
| 2015/0133054 A1 | 5/2015 | Chen et al. | |
| 2017/0078954 A1* | 3/2017 | Zakaria | H04W 76/14 |
| 2017/0285788 A1* | 10/2017 | Park | H04W 8/005 |
| 2020/0004227 A1* | 1/2020 | Kang | H04W 84/12 |

* cited by examiner

IMAGE DISPLAY DEVICE, METHOD OF CONNECTING PERIPHERAL DEVICE, AND IMAGE DISPLAY SYSTEM INCLUDING SAME IMAGE DISPLAY DEVICE

CROSS-REFERENCE TO RELATED APPLICATION

Pursuant to 35 U.S.C. § 119, this application claims the benefit of an earlier filing date and priority to Korean Application No. 10-2019-0108982 filed in the Republic of Korea on Sep. 3, 2019, the contents of which are incorporated by reference herein in its entirety.

BACKGROUND OF THE DISCLOSURE

1. Field of the Disclosure

The present disclosure relates to an image display device, a method of connecting a peripheral device and the image display device, and an image display system including the image display device. More particularly, the present disclosure relates to an image display device that can make a fast connection to a peripheral device, a method of connecting an image display device to a peripheral device, and an image display system including the image display device.

2. Description of the Related Art

An image display device refers to a device for reproducing images content such as video clips received from various sources. An image display device may be implemented in the form of a personal computer (PC), a smartphone, a tablet PC, a laptop computer, or a TV set. Advanced image display devices are configured to connect with various external devices to receive various types of information from the external devices. However, such a configuration has a problem in that as many remote controls as the number of external devices (for example, a set-top box (STB), a Blu-ray disk (BD) player, a personal computer (PC), etc.) connected to an image display device are required to control the image display device and the external devices.

In order to solve this problem, an integrated remote control setting function for using a remote control of an image display device as a remote control of an external device such as a set top box has been used. When a user inputs an instruction to the remote control set by the integrated remote control function, the remote control transmits a cost set corresponding to the instruction to the image display device, and the image display devices receives and transforms the code set into an IR signal, and transmits the IR signal to the external device such as a set-top box.

However, when the external device such as a set-top box is accommodated in a cabinet rather than being exposed to the outside, the IR signal may not pass through the cabinet. That is, there is a problem in that the external device cannot receive the IR signal.

To solve this problem, there have been various attempts. One of them is a method of installing a relay device such as an IR blaster in the same cabinet and controlling the external device via the relay device. The image display device and the relay device communicate using an RF communication scheme. Whenever the power of the image display device is turned on and off, the image display device is connected to and disconnected from the relay device. In this instance, the connection between the image display device and the relay device is made after the image display device scans advertising packets transmitted from the relay device. When the timing of the scanning of the image display device and the timing of transmission of an advertising packet are not properly matched, it usually takes at least 30 seconds to 1 minute until the image display device is connected to the relay device. In this instance, a user instruction input to a remote control during this connection process cannot be executed. In addition, when the connection between the image display device and the relay device is delayed, there is a problem in that the external device accommodated in the cabinet cannot receive an IR code set transmitted from the remote control which is set by the integrated remote control function.

SUMMARY OF THE INVENTION

An objective of the present disclosure is to provide an image display device capable of making a faster connection to a relay device that transmits a control signal to an external device, a method of connecting the image display device to a peripheral device, and an image display system including the image display device.

Another objective of the present disclosure is to provide an image display device capable of making a faster connection to a relay device in a case where the relay device has been connected to the image display device, a method of connecting the image display device to a peripheral device, and an image display system including the image display device. A further objective of the present disclosure is to provide an image display device capable of enabling a relay device to respond faster when there is a user input signal transmitted to the image display device from a remote control that is connected to the image display device, a method of connecting the image display device to a peripheral device, and an image display system including the image display device.

The image display device, the peripheral device connection method, and the image display system according to exemplary embodiments of the present disclosure can make a faster connection to a relay device by adjusting a scan interval for connection to the relay device in a case where there is a record of informing that the image display device has been connected to the relay device.

The image display device, the peripheral device connection method, and the image display system according to exemplary embodiments of the present disclosure can make a faster connection to a relay device by adjusting a scan interval for connection to the relay device when an interruption signal transmitted from a remote control is detected at the time of connecting to the relay device.

The image display device, the peripheral device connection method, and the image display system according to exemplary embodiments of the present disclosure enables a relay device to respond faster by adjusting the latency of the relay device when the image display device is connected to a remote control and a signal is transmitted from the remote control.

As described above, the image display device, the peripheral device connection method, and the image display system according to exemplary embodiments of the present disclosure can a faster connection to a relay device by checking a connection log of the image display device.

As described above, the image display device, the peripheral device connection method, and the image display system according to exemplary embodiments of the present disclosure can make a faster connection to a relay device by adjusting a scan interval according to whether or not an interruption signal transmitted from a remote control is detected.

As described above, the image display device, the peripheral device connection method, and the image display system according to exemplary embodiments of the present disclosure enables a relay device to respond faster by adjusting the latency of the relay device according to whether the image display device has been connected to the relay device when the image display device receives a signal from a remote control.

BRIEF DESCRIPTION OF THE DRAWINGS

The above and other objects, features, and other advantages of the present disclosure will be more clearly understood from the following detailed description taken in conjunction with the accompanying drawings, in which.

DETAILED DESCRIPTION OF THE EMBODIMENTS

Reference now should be made to the drawings, in which the same reference numerals are used throughout the different drawings to designate the same or similar components. Hereinafter, specific embodiments of the present disclosure will be described in detail with reference to the accompanying drawings.

The advantages and features of the present disclosure and the manner of achieving them will become apparent with reference to the embodiments described in detail below and the accompanying drawings. The present disclosure may, however, be embodied in many different forms and should not be construed as being limited to the embodiments set forth herein. Rather, these embodiments are provided so that the present disclosure will be thorough and complete and will fully convey the concept of the invention to those skilled in the art. Thus, the present disclosure will be defined only by the scope of the appended claims. Like numbers refer to like elements throughout the following description herein.

Figure 1:
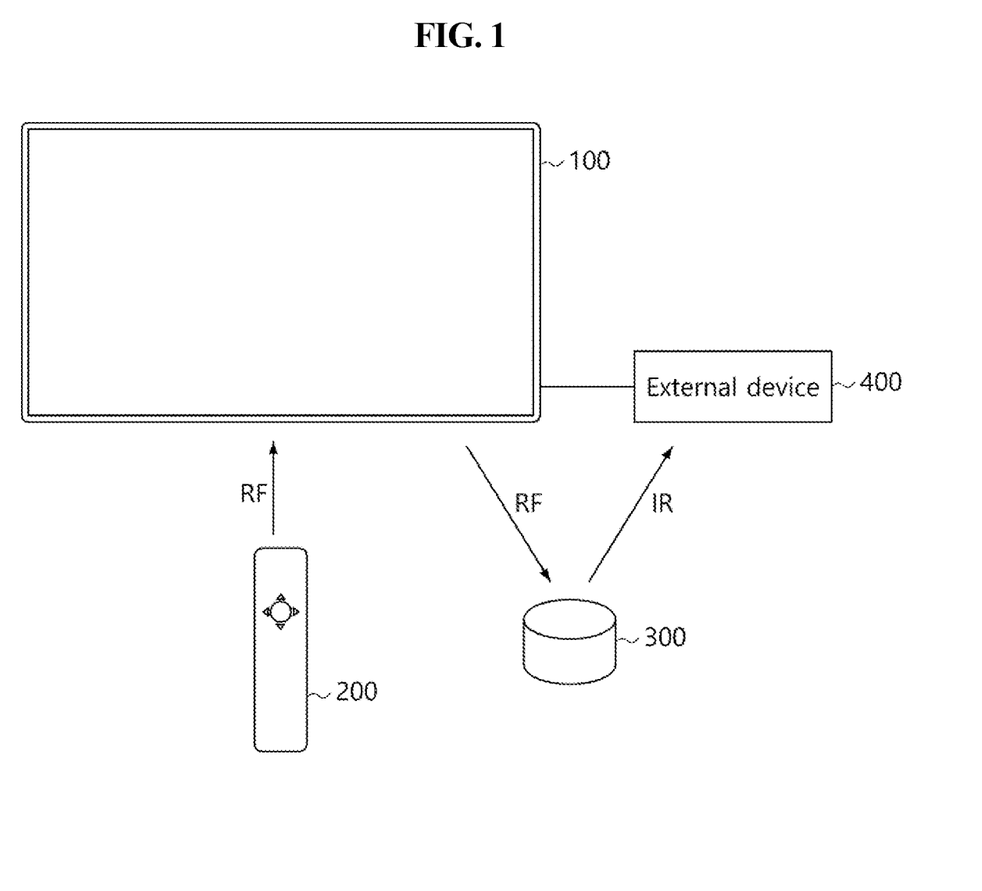
FIG. 1 is a diagram schematically illustrating an image display system according to one exemplary embodiment of the present disclosure.

FIG. 1 is a schematic view illustrating an image display system according to one exemplary embodiment of the present disclosure. The image display system includes an image display device 100, a remote control device 200, and an external device 400. A relay device 300 is also illustrated. The image display device 100 receives and displays an image on the screen thereof and may be a smart TV, a PDA, or the like. The image display device 100 may also be configured to receive a broadcast signal.

In addition, the remote control device 200 receives an instruction input by a user and transmits an input signal (instruction) to the image display device 100. The remote control device 200 includes a radio frequency (RF) module that can communicate with the image display device 100 according to an RF communication scheme. The RF module may be a Bluetooth module, an NFC module, or a WRAN module. Further, the remote control device 200 includes an input unit such as a keypad, a button, a touch pad, or a touch screen to receive a user instruction as an input, a motion sensor for sensing motion information, and a speech recognition module for recognizing a user's speech. In this embodiment, the remote control device 200 communicates with the image display device 100 according to the Bluetooth communication scheme.

The relay device 300 receives and transforms a control signal transmitted from the image display device 100 and transmits the transformed control signal to the external device 400. The relay device 300 includes an RF communication module for performing communication with the image display device 100 according to an RF communication scheme and an infrared (IR) communication module for performing communication with the image display device 100 according to an IR communication scheme. The relay device 300 includes an IR blaster.

In addition, the external device 400 is a signal source for transmitting a video signal (i.e., image signal) to the image display device 100. For example, the external device 400 may be a PC, a set top box, a BD player, a multimedia playback device, or the like. In this embodiment, the external device 400 is a set-top box.

Referring to FIG. 1, communication between the image display device 100 and the remote control device 200 and communication between the image display device 100 and the relay device 300 may be performed according to an RF communication scheme via the Bluetooth module. On the other hand, communication between the relay device 300 and the external device 400 may be performed according to the IR communication scheme via the IR module.

Further, the image display device 100 receives an image from the external device 400 and displays the image on the screen thereof. When the image display device 100 receives a user instruction through the RF communication using the remote control device 200 or through speech recognition, the image display device 100 generates a set of codes and transmits the set of codes to the relay device 300 via the RF module. The relay device 300 transforms the received code set into an IR signal and transmits the IR signal to the external device 400. The external device 400 then executes the instruction corresponding to the received IR signal and transmits an image to the image display device 100.

Figure 2:
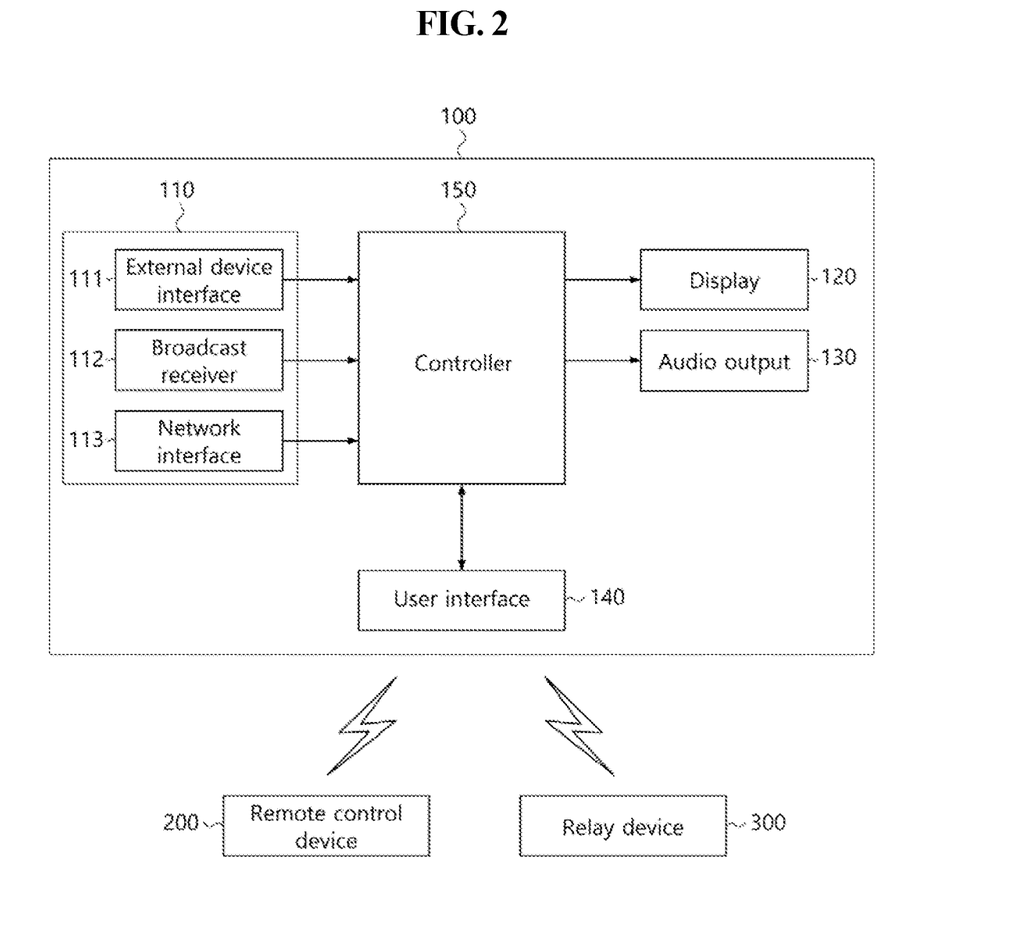
FIG. 2 is a block diagram illustrating an image display device according to one exemplary embodiment of the present disclosure.

Next, FIG. 2 is a block diagram illustrating an image display device 100 according to one embodiment of the present disclosure. Referring to FIG. 2, the image display device 100 includes a signal receiver 110, a display unit 120, an audio output unit 130, a user input interface unit 140, and a controller 150.

The signal receiver 110 receives signals from various external devices 400. As shown, the signal receiver 110 includes an external device interface unit 111 for connection with the external device 400, a broadcast receiver 112 for receiving a broadcast signal, and a network interface unit 113 for connection with the Internet.

The external device interface unit 111 may include, for example, a high definition multimedia interface (HDMI) connector, a component video connector, a composite video connector, and a D-sub connector to receive contents to be displayed from a PC, a set-top box, or a multimedia playback device. Further, the network interface unit 113 includes a communication module for connection with a cable/wireless network including the Internet. The network interface unit 113 may include an Ethernet terminal for connection with a cable network. In addition, the network interface unit 113 may use, for connection with a wireless network, a communication scheme such as wireless LAN (WLAN), Wi-Fi, wireless broadband (Wibro), world interoperability for microwave access (Wimax), or high speed downlink packet access (HDDPA).

The broadcast receiver 112 may include an RF tuner that receives a radio frequency (RF) broadcast signal and performs channel tuning to generate an intermediate frequency (IF) signal, and a demodulator that demodulates the IF signal. In addition, the display unit 120 may be implemented in the form of a display panel on which an image is to be displayed. The display panel may be a liquid crystal display (LCD) panel, a light emitting diode (LED) panel, an organic light emitting diode (OLED) panel, or the like. The display unit 120 includes a display module for displaying an image and a display driver for driving the display module. When the display module is an LCD module, the display unit 120 further includes a backlight unit for emitting light to the display module and a backlight driver for driving the backlight unit.

The audio output unit 130 receives a processed audio signal, such as a stereo signal, a 3.1-channel signal or a 5.1-channel signal and outputs sound corresponding to the processed audio signal. The audio output unit may be a speaker. The user input interface unit 140 transmits a signal input by a user to the controller 150, or transfers a signal received from the controller 150 to a peripheral device, such as the remote control device 200 or the relay device 300. To this end, the user input interface unit 140 may include a communication module for communicating with the remote control device 200 or the relay device 300. For example, the user input interface unit 140 may include a communication module to receive control signals such as a power ON/OFF signal, a channel selection signal, and a screen setting signal from the remote control device 200 according to an appropriate communication scheme such as Bluetooth, ultra wide band (ultra WB), ZigBee, radio frequency (RF) communication, or infrared (IR) communication or to transfer control signals received from the controller to the remote control device 200 or the relay device 300. In addition, the user input interface unit 140 may include a microphone and/or a speech recognition integrated circuit (IC) to receive and recognize user speech in a long distance. The communication module of the user input interface unit 140 may be integrated with the wireless communication module of the network interface unit 113.

The controller 150 controls the overall operation of the image display device 100 according to user instructions that are input through the user input interface unit 140 or according to instructions of an internal program. When the controller 150 receives an image playback instruction with respect to an image transmitted from the external device 400, as a user instruction, from the user input interface unit 140, the controller 150 controls the image display device such that an image signal and/or an audio signal received from the external device 400 through the external device interface unit 111 are processed and then output through the display unit 120 and/or the audio output unit 130. In addition, the controller 150 searches a database for a remote control code set corresponding to the user instruction input through the remote control device 200 and transmits the code set to the relay device 300 through the user input interface unit 140 according to an RF communication scheme. Next, the external device 400 that receives the control signal through the relay device 300 performs an operation corresponding to the control signal, thereby transmitting an image to the image display device 100.

The controller 150 may include a memory and a processor. The memory stores a program code for signal processing and operation control, a processed image signal, a processed audio signal, and/or various types of data. The processor executes the program code. The memory may store a signal processing program and a control program. In addition, the memory may store processed image signals, audio signals, or data. In addition, the memory may temporarily store an image signal, an audio signal, or a data signal input through the external device interface 111 or the network interface unit. In addition, the memory may store various OSs, middleware, platforms, and various applications for operation of the image display device 100.

The controller 150 controls the user input interface unit 140 for connection to and disconnection from the relay device 300 when the power is turned on and off. For connection to the relay device 300, the controller 150 checks a connection log (connection history). When it is confirmed that the connection log includes a record of informing that the relay device 300 has been connected to the image display device 100, the controller 150 adjusts a scan interval so that the connection with the relay device 300 can be quickly achieved.

In more detail, in the internal memory of the image display device 100, the connection log (connection history) is stored. The controller 150 can thus check the connection log to determine whether the image display device 100 has been connected to the relay device 300. In addition, the controller 150 changes the latency of the relay device 300 when a user instruction is input through the remote control device 200 after the image display device is connected with the relay device 300, thereby enabling a faster response to the user instruction.

Figure 3:
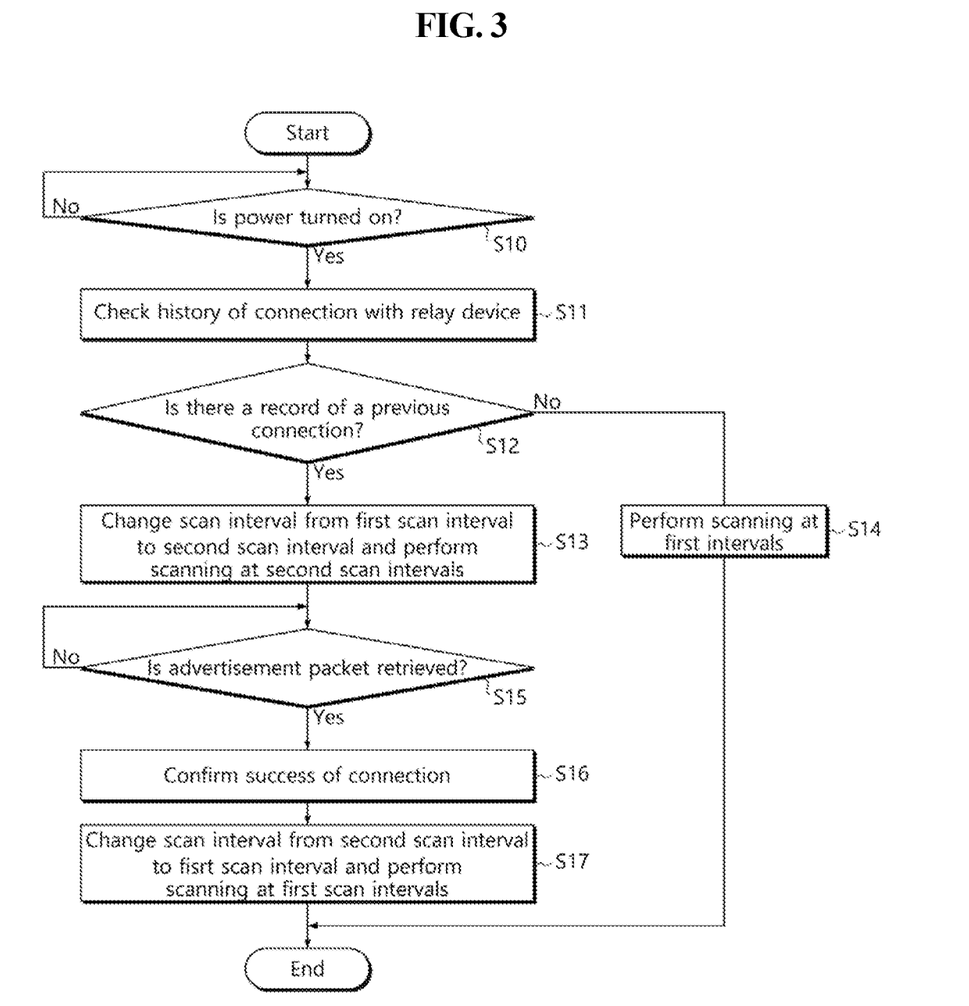
FIG. 3 is a flowchart illustrating a control method of an image display device according to one exemplary embodiment of the present disclosure.

Next, FIG. 3 is a flowchart of a control method of the image display device 100 according to one embodiment of the present disclosure. Referring to FIG. 3, when a power-on instruction is input by the user through the remote control device 200 or the user input interface unit 140, the controller 150 turns on the power (S10) and checks the connection log for records of previous connections to the relay device 300 (S11). In the internal memory of the image display device 100, the connection log (history of connections to peripheral devices) is stored. The controller 150 can check the connection log to determine whether the image display device 100 has been connected to the relay device 300.

When it is confirmed that the image display device has been connected to the relay device (Yes in S12), the controller 150 changes a scan interval that is preset to retrieve advertising packets transmitted from the relay device 300 from a first scan interval to a second scan interval (S13). Here, the first scan interval is a scan interval set in default settings. Conventionally, the scan interval of an image display device is fixed regardless of whether the image display device has been connected to a relay device.

However, the image display device 100 according to one embodiment of the present disclosure can adjust the scan interval according whether or not the image display device 100 has been previously connected to the relay device 300. In addition, the second scan interval is a longer duration than the first scan interval (i.e., default settings). On the other hand, when the connection log does not include a record of informing that the image display device has been previously connected to the relay device 300 (No in S12), the controller 150 controls the user input interface unit 140 to perform a scan operation at the first scan intervals (default settings) (S14).

When an advertising packet transmitted from the relay device 300 is retrieved within a scan window of the user input interface unit 140 (Yes in S15), the connection with the relay device 300 is successfully achieved (S16). When the connection with the relay device 300 is successful, the controller 150 changes the scan interval from the second scan interval to the first scan interval and controls the user input interface unit 140 to perform a scan operation at the first scan intervals (S17).

Figure 4:
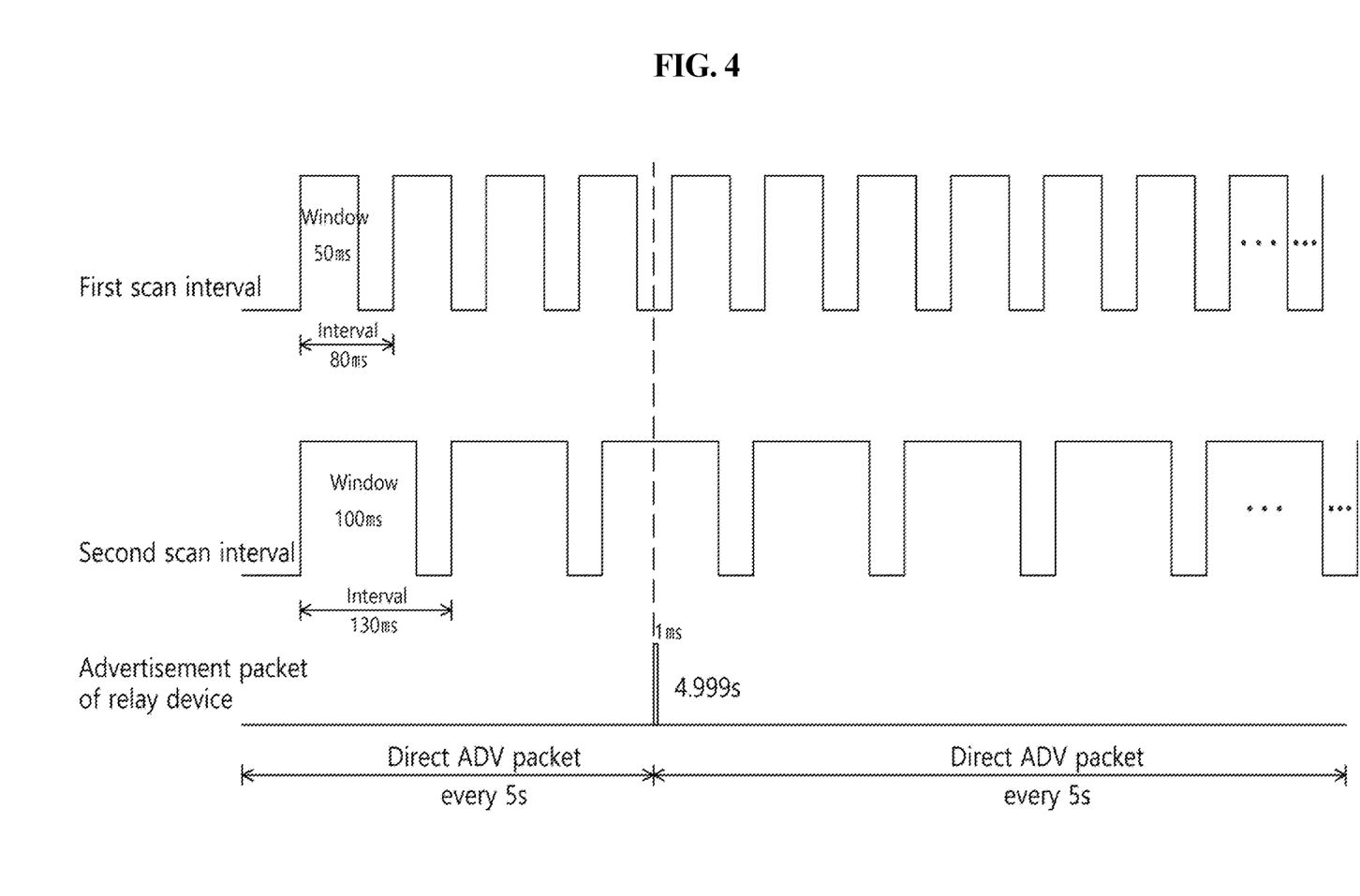
FIG. 4 is a schematic view illustrating one example of a scan interval according to one exemplary embodiment of the present disclosure.

The first scan interval and the second scan interval will now be described with reference to FIG. 4. In particular, FIG. 4 is a schematic view illustrating one example of a scan interval according to one exemplary embodiment of the present disclosure. Referring to FIG. 4, the first scan interval (i.e., default settings) is 80 ms and has a scan window of 50 ms. The image display device 100 performs a scan operation at the first scan intervals (80 ms intervals) by default during normal operation. As shown, the second scan interval is 130 ms and has a scan window of 100 ms.

The advertising packet of the relay device 300 needs to be retrieved within the scan window for successful connection between the image display device 100 and the relay device 300. Referring to FIG. 4, since the second scan interval is a longer duration than the first scan interval (default settings), the scan window of the second scan interval is also longer than the scan window of the first scan interval so that the advertising packet can be more easily retrieved. In the diagram of the scan interval, an advertising packet that cannot be retrieved through the scans performed at the first scan intervals can be retrieved through the scans performed at the second intervals.

As described above, when it is confirmed that the image display device has been connected to the relay device 300, the scan interval is increased so that a faster connection with the relay device 300 can be achieved.

Figure 5:
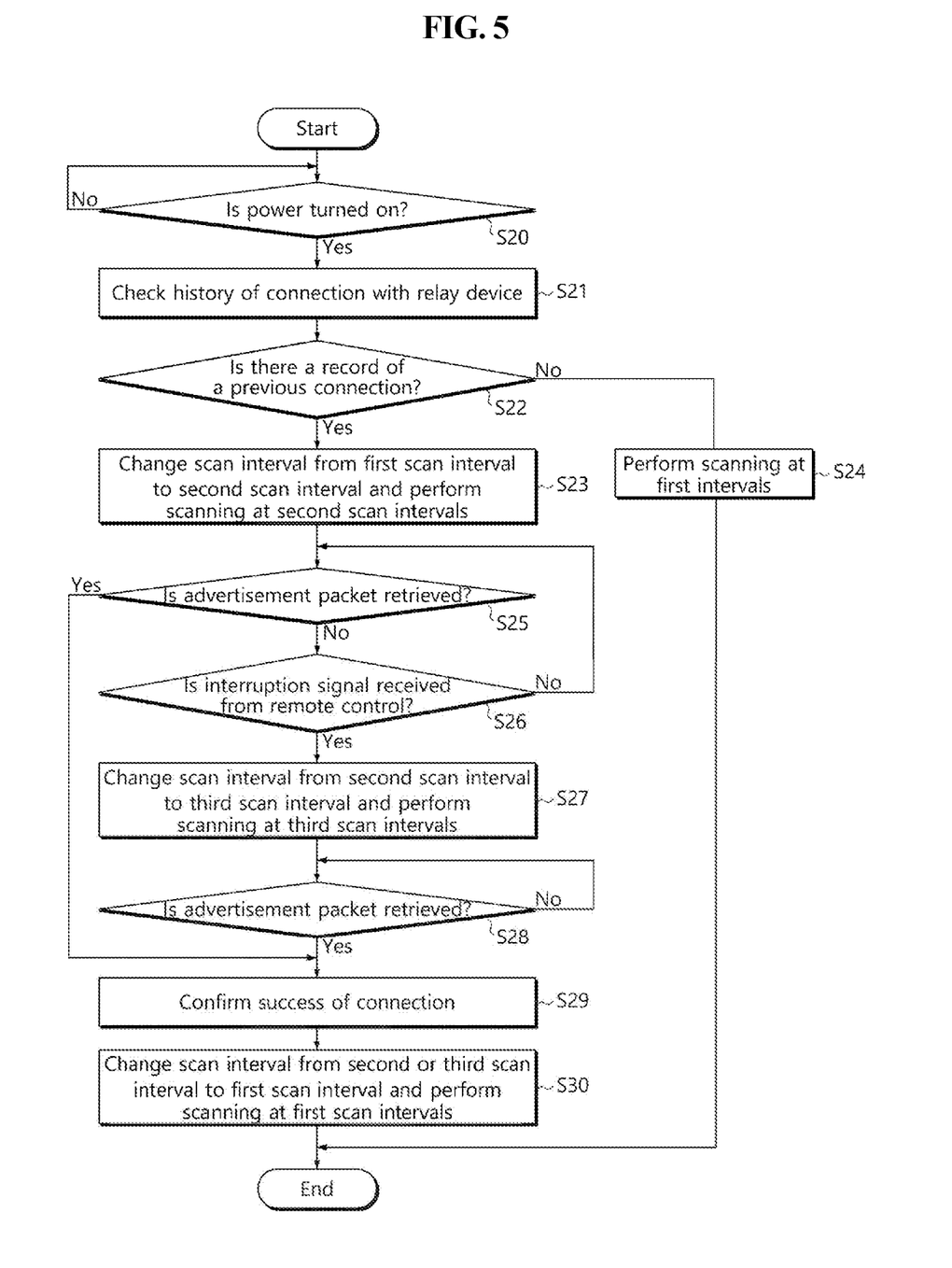
FIG. 5 is a flowchart illustrating a control method of an image display device according to another exemplary embodiment of the present disclosure.

Next, FIG. 5 is a flowchart of a control method of the image display device 100 according to another embodiment of the present disclosure. In describing this embodiments, a description about the same points as the previous embodiment will be omitted. Referring to FIG. 5, when a power-on instruction is input by the user through the remote control device 200 or the user input interface unit 140, the controller 150 of the image display device 100 turns on the power (S20) and checks a connection log thereof to check whether it has been connected to the relay device 300 (S21)

When the connection log includes a record of informing that the image display device has been connected to the relay device 300 (Yes in S22), the controller 150 changes the scan interval of the user input interface unit 140 for searching for an advertising packet transmitted from the relay device 300, from the first scan interval to the second interval (S23). As discussed above, the second scan interval is a longer duration than the first scan interval (i.e., default settings). On the other hand, when the connection log does not include a record of informing that the image display device has been connected to the relay device 300 (No in S22), the controller 150 controls the user input interface unit 140 to perform a scan operation at the first scan intervals (default settings) (S24).

When an advertising packet transmitted from the relay device 300 is retrieved within a scan window of the user input interface unit 140 (Yes in S25), the connection with the relay device 300 is achieved (S29). When the connection with the relay device 300 is successful, the controller 150 changes the scan interval from the second scan interval to the first scan interval and controls the user input interface unit 140 to perform a scan operation at the first scan intervals (S30).

On the other hand, when an interruption signal is received from the remote control device 200 within a duration of the second scan interval (No in S26), the controller 150 changes the scan interval from the second scan interval to a third scan interval and controls the user input interface unit to perform a scan operation at the third scan intervals (S27). When the user generates a motion signal or makes a key input with the remote control device 200, it is preferable to quickly connect to the relay device 300 in order to respond to the motion signal or the key input. Therefore, in this instance, the scan interval is increased to enable a faster connection to the relay device 300. In particular, the third scan interval is a longer duration than the second scan interval.

When an advertising packet transmitted from the relay device 300 is retrieved within a scan window of the user input interface unit 140 (Yes in S28), the connection with the relay device 300 is achieved (S29). The controller 150 of the image display device 100 changes the scan interval from the third scan interval to the first scan interval (default settings) after the connection with the relay device 300 is achieved, and controls the user input interface unit 140 to perform a scan operation at the first scan intervals (S30).

Figure 6:
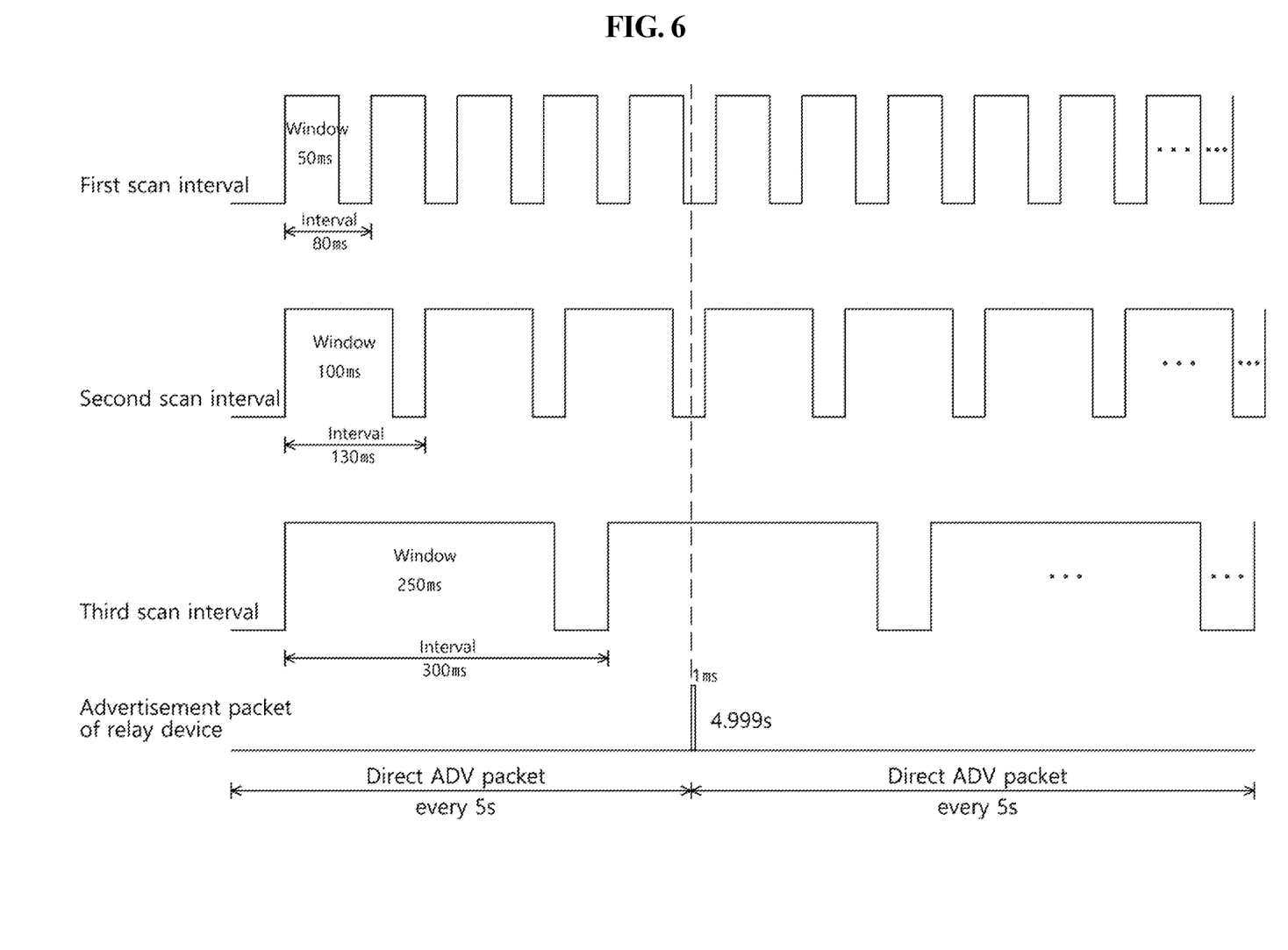
FIG. 6 is a schematic view illustrating a scan interval according to one exemplary embodiment of the present disclosure.

The first scan interval, the second scan interval, and the third scan interval will be described in more detail with reference to FIG. 6. In particular, FIG. 6 is a schematic view illustrating a scan interval according to one exemplary embodiment of the present disclosure. Referring to FIG. 6, the first scan interval (default settings) is 80 ms and has a scan window of 50 ms, and the second scan interval is 130 ms and has a scan window of 100 ms. Also, the third scan interval is 300 ms and has a scan window of 250 ms.

The connection may be successful only when the advertising packet of the relay device 300 is successfully retrieved within the scan window. Referring to FIG. 6, the second scan interval is longer than the first scan interval (default settings) and the third scan interval is longer than the second scan interval. Therefore, the second scan interval has a higher chance of successfully retrieving an advertising packet than the first scan interval, and the third scan interval has a higher chance of successfully retrieving an advertising packet than the second scan interval.

In addition, FIG. 6 illustrates when an advertising packet is unsuccessfully retrieved when the scan operation is performed at the first scan intervals or the second scan intervals but is successfully retrieved when the scan operation is performed at the third scan intervals. According to the present disclosure, it is possible to make a faster connection with the relay device 300 when a user input is anticipated, by adjusting the scan interval according to whether there was a previous connection with the relay device 300 or whether there is an interruption signal transmitted from the remote control device 200.

Hereinafter, an operation of connecting an image display device 100 and a relay device 300 in an image display system according to an embodiment of the present disclosure will be described. In particular, FIG. 7 is a flowchart illustrating a method of connecting an image display device 100 and a relay device 300 in an image display system according to one embodiment of the present disclosure, and FIG. 8 is a schematic timing chart illustrating timing of scanning of the image display device 100 and timing of advertising packet transmission of the relay device 300 during the connection operation.

Figure 7:
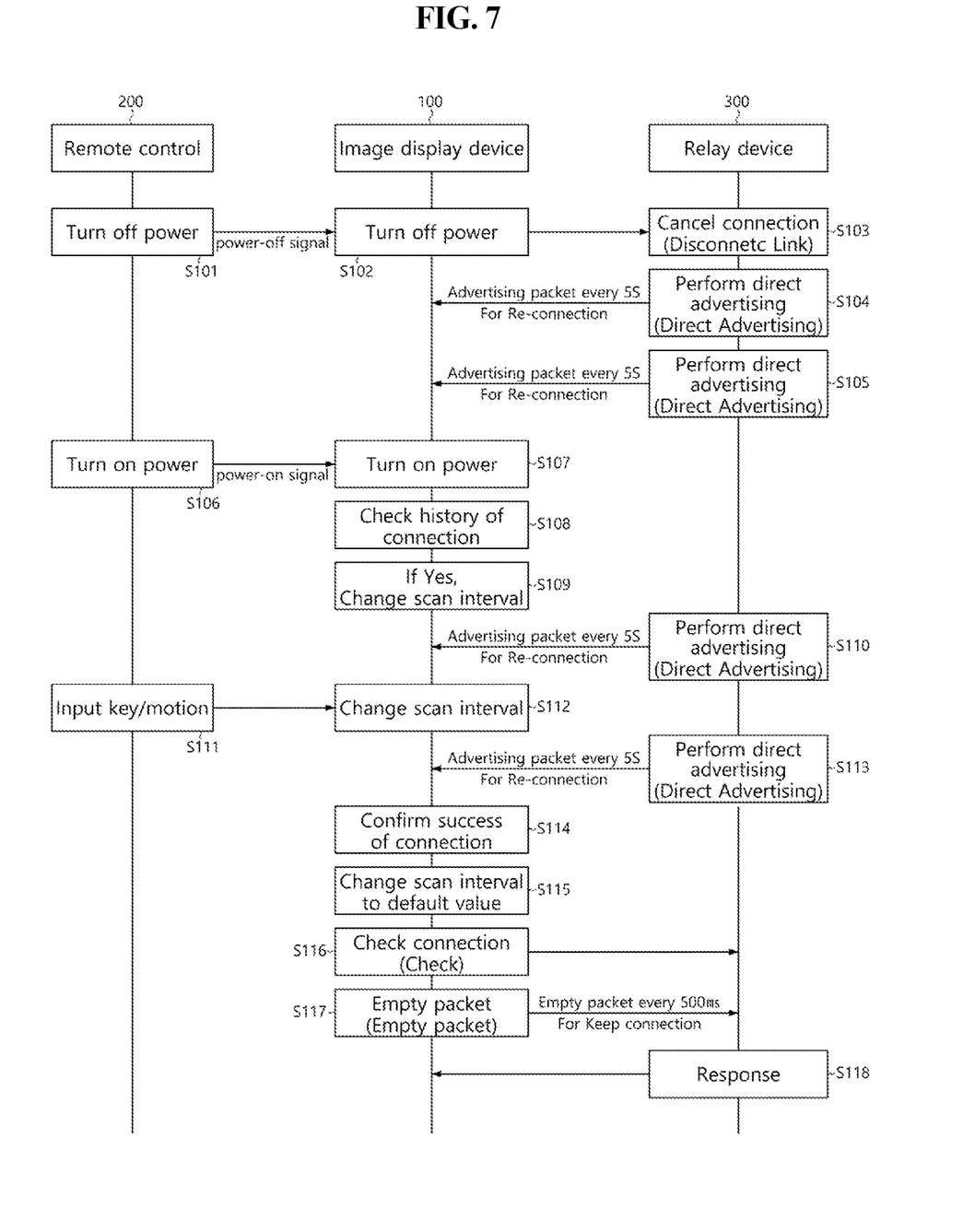
FIG. 7 is a flowchart illustrating a method of connecting an image display device with a relay device in an image display system according to one exemplary embodiment of the present disclosure.
Figure 8:
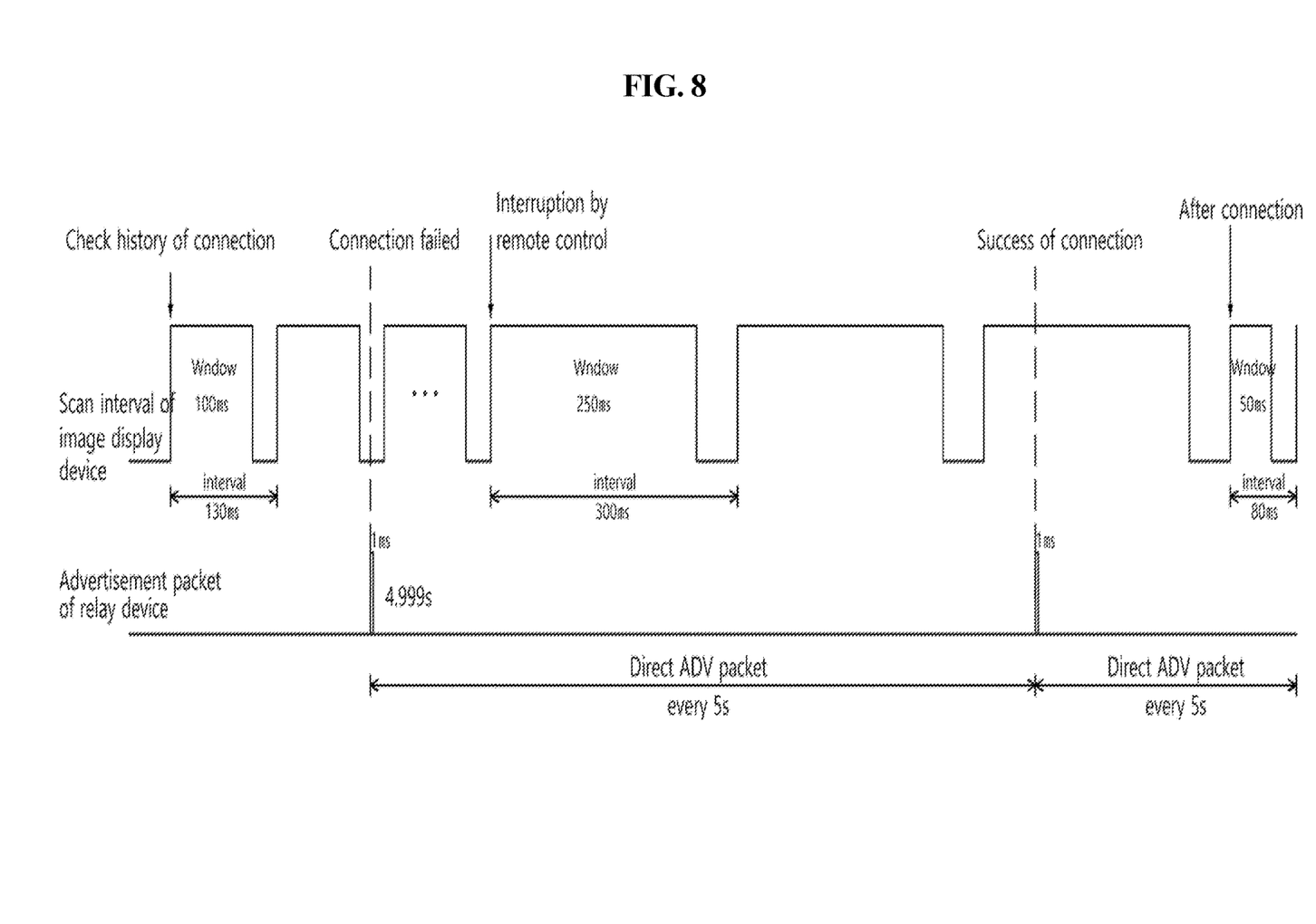
FIG. 8 is a view schematically illustrating timing of scanning of an image display device and timing of transmission of an advertising packet from a relay device according to one exemplary embodiment of the present disclosure.

Referring to FIG. 7, the image display device 100 and the relay device 300 operate as a master device and a slave device. For convenience of description, it is assumed that the image display device 100 and the relay device 300 have been connected to each other according to a Bluetooth pairing scheme. Herein, a connection flow starting from disconnection due to the power-off of the image display device 100 during connection to an external device 400 via the relay device 300 and ending with successful connection after the power-on of the image display device 100 will be described. The external device 400 is controlled via the relay device 300.

When a power key in a remote control device 200 is input in a normal operation state of the remote control device 200, the remote control device 200 transmits a power-off signal to the image display device 100 (S101) and the image display device 100 is turned off in accordance with the power-off signal (S102) after sending a power-off notification to the relay device 300 so that the relay device 300 performs a disconnection process (S103). For example, the relay device 300 is configured to operate at different intervals according to whether the relay device 300 is connected with the image display device 100 or is disconnected from the image display device 100. Specifically, the relay device 300 transmits an advertising packet at an interval of 5 seconds during a disconnected state and transmits a signal to respond to an empty packet transmitted at an interval of 500 milliseconds from the image display device 100 (which is a master device) in order to maintain the connection. Referring to FIG. 7, when the image display device 100 is disconnected (S103), the relay device 300 transmits an advertising packet for reconnection at an interval of 5 seconds (S104 and S105).

When the power key in the remote control device 200 is input again, the remote control device 200 transmits a power-on signal to the image display device 100 (S106), and the image display device 100 accordingly turns on the power (S107) and checks a connection log which is stored in the internal memory (S108). When the connection log includes a record of informing that the image display device has been previously connected to the relay device, the scan interval is changed from the first scan interval (default settings) to the second scan interval (S109). As discussed above, the second scan interval is longer than the first scan interval (default settings). That is, the image display device 100 adjusts the scan interval to more quickly search for an advertising packet transmitted from the relay device 300.

Referring to FIG. 8, when it is confirmed that the connection log includes a record of informing that the image display device 100 has been connected to the relay device 300, the image display device 100 performs a scan operation at the second scan intervals (for example, 130 ms intervals).

The image display device 100 checks the connection log as soon as the power is turned on, and performs the scan operation at the second scan intervals when it is confirmed that the connection log includes a record of informing that the image display device 100 has been connected to the relay device 300. When it is confirmed that the connection log does not include a record of informing that the image display device has been connected to the relay device 300, the scan operation is performed at the first scan intervals (default settings), for example, 80 ms intervals, as previously described.

Referring again to FIG. 7, the relay device 300 continuously transmits an advertising packet at an interval of 5 seconds for reconnection with the image display device (S110). When a key input or a motion input is made with the remote control device 200 (S111) to generate an interruption signal while the image display device 100 performs a scan operation at the second scan intervals, the image display device 100 changes the scan interval from the second scan interval to a third scan interval (S112).

Referring to FIG. 8, the scan interval is changed to the third scan interval (for example, 250 mm) at the time when an interruption signal is generated, and a scan operation is performed at the third intervals. The generation of the interruption signal means that there is a user input (instruction from the user). Therefore, in this instance, it is preferable to more quickly connect to the relay device 300 to respond to the instruction from the user. According to the present disclosure, the scan interval of the image display device 100 is adjusted to be increased.

Referring to FIG. 7, the relay device 300 continuously transmits an advertising packet for reconnection (S113), and when the advertising packet is found within the scan window through the scan operation of the image display device 100, the connection is achieved. (S114). When the connection is achieved, the image display device 100 changes the scan interval to the first scan interval (default settings) (115), transmits a connection confirmation signal to the relay device 300 (S116), and transmits an empty packet at an interval of 500 ms to maintain the connection with the relay device 300 (S117). The relay device 300 transmits a response signal as a replay to the empty packet transmitted from the image display device 100 (S118).

Referring to FIG. 8, when the connection is achieved, the image display device 100 changes the scan interval to the first scan interval (default settings) which is, for example, 800 ms and performs a scan operation at the first scan intervals.

Figure 9:
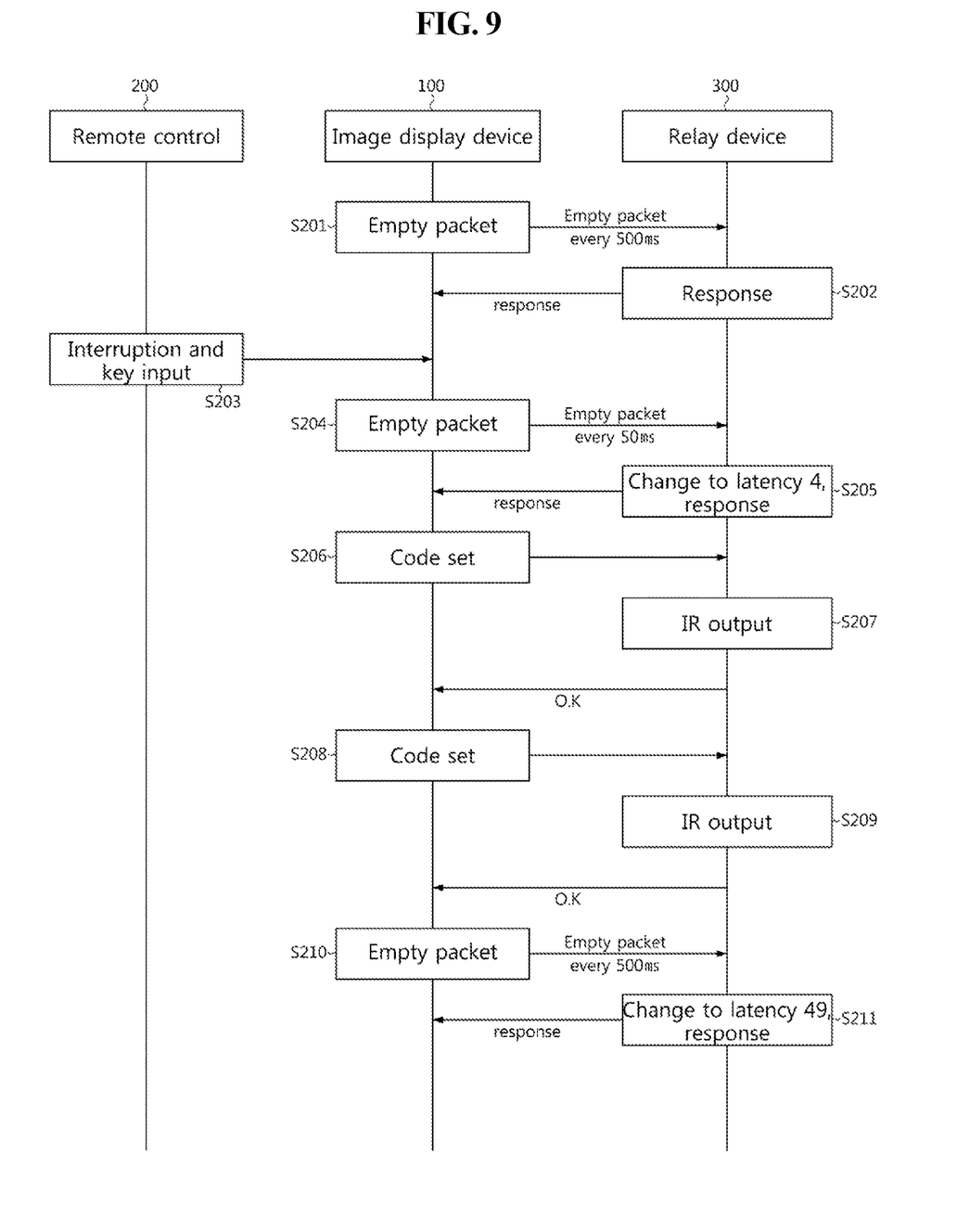
FIG. 9 is a flowchart illustrating a relay device latency adjustment method of an image display device according to one embodiment of the present disclosure.

Hereinafter, a method of adjusting the latency of a relay device 300 in an image display system according to another embodiment will be described. In describing this embodiment, a description about the same points as the previous embodiment will be omitted.

The relay device 300 operates at different intervals according to whether or not the relay device 300 is connected with the image display device 100 to save a battery power. For example, the relay device operates at an interval of 5 seconds when the relay device is not connected with the image display device 100 (master) and responds to an empty packet that is transmitted from the image display device 100 at an interval of 500 ms to maintain the connection. The time interval for which the relay device 300 waits to respond to a connection event (i.e., empty packet) of the image display device 100 (i.e., master device) is called latency.

In the image display system according to the present disclosure, the image display device 100 sets the latency of the relay device 300 to a predetermined value by transmitting and receiving data in the process of connecting to the relay device 300. In addition, the image display device 100 changes the latency of the relay device 300 according to whether the image display device has been connected to the relay device 300 or whether there is a user input, thereby causing the relay device to respond faster in order to save battery power.

When the image display device 100 receives a signal from the relay device 300 when the image display device 100 and the relay device 300 are connected to each other, the image display device 100 adjusts the latency to a second latency value from a first latency value, thereby enabling the relay device 300 to respond faster. When the remote control device 200 is connected, the relay device 300 needs to transmit an IR signal to the external device 400. Therefore, in this instance, the image display device 100 adjusts the latency to be decreased so that the relay device can respond faster. For example, when the preset latency is a latency of 49 (500 ms), the image display device 100 can change the latency to a latency of 4 (50 ms) to cause a quicker response of the relay device 300. When the remote control device 200 is disconnected, the image display device 100 can change the latency of the relay device 300 back to the first latency value to reduce the battery power consumption.

Next, FIG. 9 is a flowchart illustrating a method of adjusting the latency of the relay device 300 in the image display system according to an embodiment of the present disclosure. Referring to FIG. 9, when the image display device 100 and the relay device 300 are connected, the image display device 100 transmits an empty packet at 500 ms intervals to maintain the connection (S201). The relay device 300 transmits a response signal thereto (S202). The image display device 100 and the relay device 300 transmit and receive signals at 500 ms intervals, and the relay device 300 operates at a latency of 49 (500 ms).

When the image display device 100 and the relay device 300 are connected, and when an interruption signal is received from the remote control device 200 and thus the remote control device 200 is connected (S203), the image display device 100 changes the latency of the relay device 300 from a latency of 49 (500 ms) to a latency of 4 (50 ms) (S205) by transmitting an empty packet to the relay device 300 at 50 ms intervals (S204). The relay device 300 changes a waiting time to correspond to a latency of 4 (50 ms) and responds to a connection event (S205). Accordingly, the relay device 300 responds at 50 ms intervals to connection events occurring at 50 ms intervals.

The image display device 100 transmits a code set corresponding to a key input on the remote control device 200 to the relay device 300 in the form of an RF signal via the Bluetooth module (S206), and the relay device 300 receives and transforms the code set and transmits an IR signal to the external device 400 (S207). When there are a plurality of key inputs on the remote control device 200, the image display device 100 sequentially transmits code sets corresponding to the respective key inputs (S208), and the relay device 300 transmits corresponding IR signals to the external device 400 (S209).

When the key inputs are stopped and the remote control device 200 is disconnected, the image display device 100 transmits empty packets at 50 ms intervals to the relay device 300 (S210), and changes the latency of the relay device 300 from a latency of 4 (50 ms) to a latency of 49 (500 ms) (S211).

As described above, the image display device 100 and the image display system including the same according to the present disclosure can adjust the scan interval for faster connection when the connection with the relay device 300 is performed, and can enable a faster IR output by adjusting the latency of the relay device 300 in accordance with the user input after the scan interval is adjusted.

The operation method of the image display device 100 of the present disclosure may be implemented in the form of a processor-readable code stored in a processor-readable recording medium that can be read by the processor of the image display device 100. The processor-readable recording media include all kinds of recording devices that store data that can be read by a processor. Specific examples of the processor-readable recording medium include a ROM, a RAM, a CD-ROM, a magnetic tape, a floppy disk, an optical data storage device, and the like. The processor-readable recording medium may be implemented in the form of a carrier wave for transmission of a signal over the Internet. The processor-readable recording medium may also be distributed over computer systems connected via a network, and the code may be stored and executed in the distributed processor-readable recording medium.

Although the preferred embodiments of the present disclosure have been described for illustrative purposes, those skilled in the art will appreciate that various modifications, additions, and substitutions are possible, without departing from the scope and spirit of the present disclosure as defined in the appended claims. It is thus well known to those skilled in the art that the present invention is not limited to the embodiments disclosed in the detailed description but rather cover various modifications, additions, substitutions, and equivalents to the embodiments.

What is claimed is:

1. An image display device comprising:
an external device interface unit configured to connect the image display device with an external device;
a display unit configured to display an image received from the external device;
a user input interface unit configured to receive an input signal and to send a control signal corresponding to the input signal to a relay device acting a communication relay between the image display device and the external device; and
a controller configured to:
in response to the image display device being powered on, check whether or not a connection log of the image display device includes a previous connection between the image display device and the relay device,
scan for an advertisement packet from the relay device at a first scan interval when the connection log does not include the previous connection between the image display device and the relay device, and
scan for the advertisement packet from the relay device at a second scan interval having a longer time duration than the first scan interval when the connection log includes the previous connection between the image display device and the relay device.

2. The image display device according to claim 1, wherein the controller is further configured to:
in response to receiving an interruption signal input to the user input interface unit from a remote control device while scanning at the second scan interval, scan for the advertisement packet from the relay device at a third scan interval having a longer time duration than the second scan interval.

3. The image display device according to claim 1, wherein the controller is further configured to:
in response to receiving a connection signal input to the user input interface from a remote controller while scanning at the second scan interval, scan for the advertisement packet from the relay device at a third scan interval having a longer time duration than the second scan interval.

4. The image display device according to claim 1, wherein the controller is further configured to:
in response to receiving the advertisement packet within a first scan window included in the first scan interval, connect the image display device with the relay device, and
in response to not receiving the advertisement packet within the first scan window, maintain the image display device to be disconnected from the relay device.

5. The image display device according to claim 4, wherein the controller is further configured to:
in response to receiving the advertisement packet within a second scan window included in the second scan interval, connect the image display device with the relay device, and
in response to not receiving the advertisement packet within the second scan window, maintain the image display device to be disconnected from the relay device.

6. The image display device according to claim 5, wherein the controller is further configured to:
in response to receiving the advertisement packet within a third scan window included in a third scan interval having a longer time duration than the second scan interval, connect the image display device with the relay device, and
in response to not receiving the advertisement packet within the third scan window, maintain the image display device to be disconnected from the relay device.

7. The image display device according to claim 6, wherein the third scan window has a longer time duration than the second scan window and the second scan window has a longer time duration than the first scan window.

8. The image display device according to claim 1, when the controller is further configured to:
in response to receiving a specific input signal input to the user input interface from a remote controller, generate a control signal for changing a latency value of the relay device from a first latency default value to a second latency non-default value.

9. The image display device according to claim 8, wherein the controller is further configured to:
in response to receiving a disconnection signal input to the user input interface from the remote controller, generate a control signal for changing the latency value of the relay device from the second latency value to the first latency value, and
wherein the second latency value is smaller than the first latency value.

10. The image display device according to claim 1, wherein the relay device is an Infrared (IR) blaster,
wherein the user input interface unit and the remote control device are connected through Bluetooth communication, and
wherein the user input interface unit and the relay device are connected through Bluetooth communication.

11. A method of controlling an image display device, the method comprising:
in response to the image display device being powered on, checking, via a controller of the image display device, whether or not a connection log of the image display device includes a previous connection between the image display device and a relay device acting as a communication relay between the image display device and an external device;
scanning, via the controller, for an advertisement packet from the relay device at a first scan interval when the connection log does not include the previous connection between the image display device and the relay device; and
scanning, via the controller, for the advertisement packet from the relay device at a second scan interval having a longer time duration than the first scan interval when the connection log includes the previous connection between the image display device and the relay device.

12. The method according to claim 11, further comprising:
in response to receiving an interruption signal input to the user input interface unit from a remote control device while scanning at the second scan interval, scanning for the advertisement packet from the relay at a third scan interval having a longer time duration than the second scan interval.

13. The method according to claim 11, further comprising:
in response to receiving a connection signal input to the user input interface from a remote controller while scanning at the second scan interval, scanning for the advertisement packet from the relay device at a third scan interval having a longer time duration than the second scan interval.

14. The method according to claim 11, further comprising:
in response to receiving the advertisement packet within a first scan window included in the first scan interval, connecting the image display device with the relay device; and
in response to not receiving the advertisement packet within the first scan window, maintaining the image display device to be disconnected from the relay device.

15. The method according to claim 14, further comprising:
in response to receiving the advertisement packet within a second scan window included in the second scan interval, connecting the image display device with the relay device; and
in response to not receiving the advertisement packet within the second scan window, maintaining the image display device to be disconnected from the relay device.

16. The method according to claim 15, further comprising:
in response to receiving the advertisement packet within a third scan window included in a third scan interval having a longer time duration than the second scan interval, connecting the image display device with the relay device; and
in response to not receiving the advertisement packet within the third scan window, maintaining the image display device to be disconnected from the relay device.

17. The method according to claim 16, wherein the third scan window is longer than the second scan window and the second scan window is longer than the first scan window.

18. An image display system comprising:
an image display device displaying an image signal input from an external device and transmitting a control signal corresponding to a user input signal for controlling the external device to a relay device;

a remote control device transmitting the user input signal to the image display device; and the relay device receiving the control signal from the image display device, transforming the control signal from a first communication energy to a second communication energy, and transmitting the transformed signal to the external device, wherein the image display device:

in response to the image display device being powered on, checks whether or not a connection log of the image display device includes a previous connection between the image display device and the relay device, scans for an advertisement packet from the relay device at a first scan interval when the connection log does not include the previous connection between the image display device and the relay device, and scans for the advertisement packet from the relay device at a second scan interval having a longer time duration than the first scan interval when the connection log includes the previous connection between the image display device and the relay device.

19. The image display system according to claim 18, wherein when the image display device is connected to the remote control device and an input signal is transmitted from the remote control device to the image display device, the image display device generates a control signal for changing a latency of the relay device from a first latency value to a second latency value, wherein when the remote control device is disconnected, the image display device transmits a control signal for changing the latency of the relay device from the second latency value to the first latency value, to the relay device, and wherein the second latency value is smaller than the first latency value.

20. The image display system according to claim 18, wherein the relay device is an Infrared (IR) blaster, wherein the image display device and the remote control device are connected through Bluetooth communication, and wherein the image display device and the relay device are connected through Bluetooth communication.

\* \* \* \* \*